US008927454B2

(12) United States Patent
Itou et al.

(10) Patent No.: US 8,927,454 B2
(45) Date of Patent: Jan. 6, 2015

(54) EXHAUST GAS-PURIFYING CATALYST
(75) Inventors: Minoru Itou, Kakegawa (JP);
Michihiko Takeuchi, Kakegawa (JP);
Tetsuya Shinozaki, Kakegawa (JP);
Takaaki Kanazawa, Toyota (JP);
Masaya Kamada, Toyota (JP); Tadashi Suzuki, Seto (JP); Satoru Katoh,
Nisshin (JP); Naoki Takahashi, Nagoya (JP)
(73) Assignee: Cataler Corporation, Shizouka (JP)
( * ) Notice: Subject to any disclaimer, the term of this patent is extended or adjusted under 35 U.S.C. 154(b) by 0 days.
(21) Appl. No.: 13/282,803
(22) Filed: Oct. 27, 2011
(65) Prior Publication Data
US 2012/0040824 A1  Feb. 16, 2012
Related U.S. Application Data
(63) Continuation of application No. PCT/JP2010/057478, filed on Apr. 27, 2010.
(30) Foreign Application Priority Data Apr. 28, 2009  (JP) ................... 2009-109850

(51) Int. Cl.
| B01J 23/00 | (2006.01) |
|---|---|
| B01J 23/02 | (2006.01) |
| B01J 23/08 | (2006.01) |
| B01J 23/40 | (2006.01) |
| B01J 23/42 | (2006.01) |
| B01J 23/44 | (2006.01) |
| B01J 23/56 | (2006.01) |
| B01J 21/00 | (2006.01) |
| B01J 21/04 | (2006.01) |
| B01J 20/00 | (2006.01) |
| F01N 3/28 | (2006.01) |
| B01D 53/94 | (2006.01) |
| B01J 23/63 | (2006.01) |
| B01J 35/00 | (2006.01) |
| B01J 35/04 | (2006.01) |
| B01J 37/02 | (2006.01) |

(52) U.S. Cl.
CPC .......... *F01N 3/2828* (2013.01); *B01D 53/9472* (2013.01); *B01J 23/63* (2013.01); *B01J 35/0006* (2013.01); *B01J 35/04* (2013.01); *B01J 37/0244* (2013.01); *B01D 53/9413* (2013.01); *B01D 2255/1021* (2013.01); *B01D 2255/1023* (2013.01); *B01D 2255/1025* (2013.01); *B01D 2255/2065* (2013.01); *B01D 2255/20715* (2013.01); *B01D 2255/2092* (2013.01); *B01D 2255/407* (2013.01); *B01D 2255/902* (2013.01); *B01D 2255/908* (2013.01); *F01N 2550/02* (2013.01); *Y10S 502/52712* (2013.01); *Y10S 502/52713* (2013.01); *Y10S 502/52719* (2013.01)
USPC ........... 502/339; 502/258; 502/261; 502/262; 502/263; 502/327; 502/332; 502/333; 502/334; 502/355; 502/415; 502/439; 502/527.12; 502/527.13; 502/527.19
(58) Field of Classification Search
USPC ......... 502/258, 261, 262, 263, 327, 332, 333, 502/334, 339, 355, 415, 439, 527.12, 502/527.13, 527.19; 422/170–180
See application file for complete search history.

(56) References Cited
U.S. PATENT DOCUMENTS 5,730,580 A * 3/1998 Japikse ...................... 415/208.3
6,294,140 B1 * 9/2001 Mussmann et al. ........ 423/213.5
(Continued)

FOREIGN PATENT DOCUMENTS

CN    101227977 A    7/2008
EP    0 244 127 A1   11/1987
(Continued)

OTHER PUBLICATIONS

International Search Report mailed by the International Searching Authority (ISA/JP) on Jul. 13, 2010 in connection with PCT International Application No. PCT/JP2010/057478, filed Apr. 27, 2010.

(Continued)

*Primary Examiner* — Cam N. Nguyen
(74) *Attorney, Agent, or Firm* — John P. White; Cooper & Dunham LLP

(57) ABSTRACT

An exhaust gas-purifying catalyst includes a support provided with one or more through-holes through which exhaust gas flows, and a catalytic layer supported by the support and containing an oxygen storage material. The exhaust gas-purifying catalyst includes a first section to which the exhaust gas is supplied, and a second section to which the exhaust gas having passed through the first section is supplied. The catalytic layer includes a layered structure of a first catalytic layer containing platinum and/or palladium and a second catalytic layer containing rhodium in the first catalytic section and further includes a third layer containing rhodium in the second section. The second section is smaller in oxygen storage material content per unit volumetric capacity than the first section.

17 Claims, 2 Drawing Sheets

(56) References Cited

U.S. PATENT DOCUMENTS

| | | | |
|---|---|---|---|
| 6,348,430 B1* | 2/2002 | Lindner et al. | 502/304 |
| 6,375,910 B1* | 4/2002 | Deeba et al. | 423/239.1 |
| 6,764,665 B2* | 7/2004 | Deeba et al. | 423/239.1 |
| 6,864,214 B2* | 3/2005 | Uenishi et al. | 502/304 |
| 7,022,646 B2* | 4/2006 | Li | 502/339 |
| 7,329,629 B2* | 2/2008 | Gandhi et al. | 502/325 |
| 7,517,510 B2* | 4/2009 | Chen et al. | 423/213.2 |
| 7,547,656 B2* | 6/2009 | Miura | 502/327 |
| 7,550,124 B2* | 6/2009 | Chen et al. | 423/213.2 |
| 7,576,031 B2* | 8/2009 | Beutel et al. | 502/339 |
| 7,622,096 B2* | 11/2009 | Deeba et al. | 423/213.2 |
| 7,638,460 B2* | 12/2009 | Nakamura et al. | 502/326 |
| 7,737,077 B2* | 6/2010 | Kitamura et al. | 502/326 |
| 7,754,171 B2* | 7/2010 | Chen et al. | 423/213.2 |
| 7,758,834 B2* | 7/2010 | Chen et al. | 423/213.2 |
| 7,759,283 B2* | 7/2010 | Yamato et al. | 502/339 |
| 7,795,172 B2* | 9/2010 | Foong et al. | 502/327 |
| 7,816,300 B2* | 10/2010 | Takeuchi et al. | 502/325 |
| 7,842,643 B2* | 11/2010 | Yabuzaki et al. | 502/303 |
| 7,846,865 B2* | 12/2010 | Yamato et al. | 502/327 |
| 7,875,250 B2* | 1/2011 | Nunan | 422/177 |
| 7,998,896 B2* | 8/2011 | Kitamura et al. | 502/326 |
| 8,007,750 B2* | 8/2011 | Chen et al. | 423/239.1 |
| 8,038,951 B2* | 10/2011 | Wassermann et al. | 422/168 |
| 8,058,205 B2* | 11/2011 | Nagaoka et al. | 502/330 |
| 8,066,963 B2* | 11/2011 | Klingmann et al. | 423/213.5 |
| 8,071,502 B2* | 12/2011 | Shimizu et al. | 502/325 |
| 2003/0061860 A1 | 4/2003 | Hu et al. | |

FOREIGN PATENT DOCUMENTS

| | | |
|---|---|---|
| EP | 0 566 401 A1 | 10/1993 |
| EP | 1 911 517 A1 | 4/2008 |
| EP | 2 072 121 A1 | 6/2009 |
| JP | 8-155302 A | 6/1996 |
| JP | 2004-283692 A | 10/2004 |
| JP | 2007-21456 A | 2/2007 |
| JP | 2007-38072 A | 2/2007 |
| JP | 2007-181799 A | 7/2007 |
| JP | 2009-178625 A | 8/2009 |
| WO | WO 2008/038552 A1 | 4/2008 |
| WO | WO 2009/020957 A1 | 2/2009 |

OTHER PUBLICATIONS

Written Opinion of the International Searching Authority mailed by the International Searching Authority (ISA/JP) on Jul. 13, 2010 in connection with PCT International Application No. PCT/JP2010/057478, filed Apr. 27, 2010.

Notification of Transmittal of Translation of the International Preliminary Report on Patentability and International Preliminary Report on Patentability, in connection with PCT/JP2010/057478, issued Dec. 22, 2011.

Extended European Search Report, including Supplementary Search Report and European Search Opinion, in connection with European Patent Application No. 10769747.6, issued Oct. 19, 2012.

Official action (with English Translation) dated Mar. 6, 2013, in connection with Chinese Patent Application No. 201080018596.8.

* cited by examiner

EXHAUST GAS-PURIFYING CATALYST

CROSS REFERENCE TO RELATED APPLICATIONS

This application is a Continuation Application of PCT Application No. PCT/JP2010/057478, filed Apr. 27, 2010 and based upon and claiming the benefit of priority from prior Japanese Patent Application No. 2009-109850, filed Apr. 28, 2009, the entire contents of all of which are incorporated herein by reference.

BACKGROUND OF THE INVENTION

1. Field of the Invention

The present invention relates to an exhaust gas-purifying catalyst.

2. Description of the Related Art

Emission control on automobile, etc. is tightened in recent years. In order to respond to this, developed are exhaust gas-purifying catalysts that purify nitrogen oxides, etc. contained in the exhaust gas with a higher degree of efficiency. For example, Patent document 1 discloses an exhaust gas-purifying catalyst including a support containing cerium oxide and a precious metal supported by the support. Cerium oxide has a high oxygen storage capacity and is known as a component effective in improving the performance of the exhaust gas-purifying catalyst.

These exhaust gas-purifying catalysts, however, have a problem of easily emitting hydrogen sulfide ($H_2S$), which is a cause of an offensive odor, during the process of purifying the exhaust gas. Thus, exhaust gas-purifying catalysts containing nickel (Ni) have been proposed as exhaust gas-purifying catalysts that reduce $H_2S$ emission (see Patent document 2, for example).

Ni is, however, designated as an environmental load substance in many countries and regions. For this reason, limitations on use of an exhaust gas-purifying catalyst containing a relatively large amount of Ni are becoming more widespread.

PRIOR ART DOCUMENTS

Patent document 1: JP 08-155302A
Patent document 2: EP 244127B

BRIEF SUMMARY OF THE INVENTION

An object of the present invention is to provide an exhaust gas-purifying catalyst exhibiting a sufficient performance in purifying exhaust gas with a suppressed $H_2S$ emission without using a large amount of Ni.

According to an aspect of the present invention, there is provided an exhaust gas-purifying catalyst comprising a support provided with one or more through-holes through which exhaust gas flows, and a catalytic layer supported by the support and containing an oxygen storage material, wherein the exhaust gas-purifying catalyst includes a first section to which the exhaust gas is supplied, and a second section to which the exhaust gas having passed through the first section is supplied, wherein the catalytic layer includes a layered structure of a first catalytic layer containing platinum and/or palladium and a second catalytic layer containing rhodium in the first section and further includes a third layer containing rhodium in the second section, wherein a sum of platinum and palladium contents in the first catalytic layer per unit volumetric capacity is greater than a sum of platinum and palladium contents in the second catalytic layer per unit volumetric capacity and a sum of platinum and palladium contents in the third catalytic layer per unit volumetric capacity, and a rhodium content in the second catalytic layer per unit volumetric capacity and a rhodium content in the third catalytic layer per unit volumetric capacity are greater than a rhodium content in the first catalytic layer per unit volumetric capacity, and wherein the second section is smaller in oxygen storage material content per unit volumetric capacity than the first section.

DETAILED DESCRIPTION OF THE INVENTION

Figure 1:
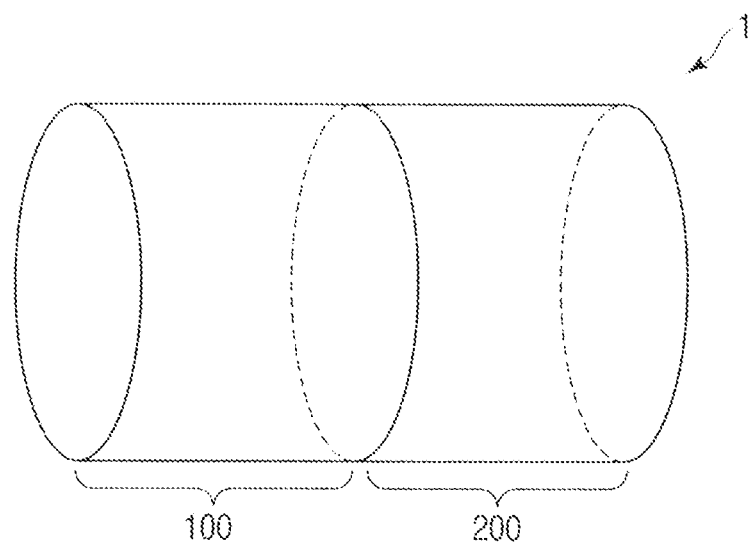
FIG. 1 is a view schematically showing an exhaust gas-purifying catalyst according to an embodiment of the present invention.
Figure 2:
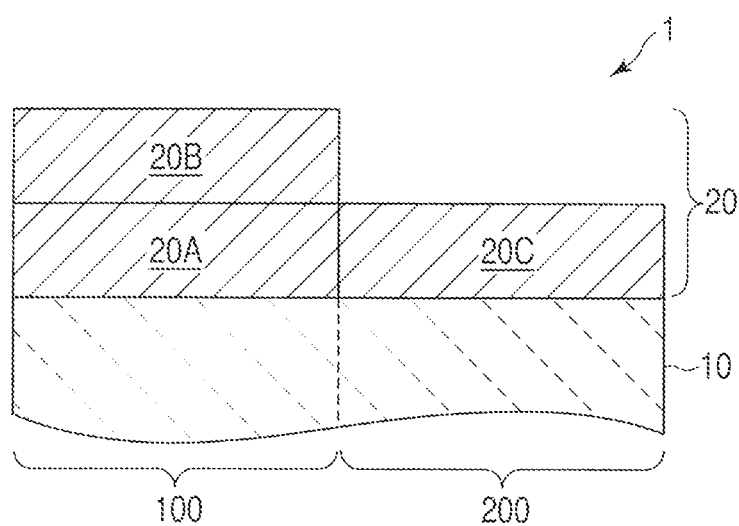
FIG. 2 is an enlarged sectional view showing a part of the exhaust gas-purifying catalyst shown in FIG. 1.

FIG. 1 is a view schematically showing an exhaust gas-purifying catalyst according to an embodiment of the present invention. FIG. 2 is an enlarged sectional view showing a part of the exhaust gas-purifying catalyst shown in FIG. 1.

The exhaust gas-purifying catalyst 1 comprises a support 10 provided with one or more through-holes through which exhaust gas flows, and a catalytic layer 20 supported by the support 10.

The exhaust gas-purifying catalyst 1 includes a first section 100 and a second section 200. The first section 100 is a section to which the exhaust gas is supplied prior to the second section is supplied with the exhaust gas. The second section 200 is a section to which the exhaust gas having passed through the first section 100 is supplied. The definition of a boundary between the first section 100 and the second section will be described later.

As the support 10, for example, a monolith honeycomb-type support is used. Typically, the support is made of ceramics such as cordierite.

The catalytic layer 20 contains precious metal. The catalytic layer 20 includes a layered structure of a first catalytic layer 20A containing platinum and/or palladium and a second catalytic layer 20B containing rhodium in the first section 100. For example, the second catalytic layer 20B faces the support 10 with the first catalytic layer 20A interposed therebetween. Alternatively, the second catalytic layer 20B may be formed between the support 10 and the first catalytic layer 20A. That is, the first catalytic layer 20A may face the support 10 with the second catalytic layer 20B interposed therebetween. The first section 100 may further include layer(s) other than the first catalytic layer 20A and the second catalytic layer 20B.

The catalytic layer 20 further includes a third catalytic layer 20C containing rhodium in the second section 200. The second section 200 may further include layer(s) other than the third catalytic layer 20C.

A sum of platinum and palladium contents in the first catalytic layer 20A per unit volumetric capacity is greater than a sum of platinum and palladium contents in the second catalytic layer 20B per unit volumetric capacity and a sum of platinum and palladium contents in the third catalytic layer 20C per unit volumetric capacity. A rhodium content in the second catalytic layer 20B per unit volumetric capacity and a rhodium content in the third catalytic layer 20C per unit volumetric capacity are greater than a rhodium content in the first catalytic layer 20A per unit volumetric capacity.

That is, the first catalytic layer 20A contains mainly platinum and/or palladium as precious metal, and the second catalytic layer 20B and the third catalytic layer 20c contain mainly rhodium as precious metal. Typically, the first catalytic layer 20A contains only platinum and/or palladium as precious metal, and the second catalytic layer 20B and the third catalytic layer 20c contain only rhodium as precious metal.

When such a structure is employed, it is possible that most of platinum and/or palladium and most of rhodium can be present apart from each other. This makes it possible to achieve an excellent performance in purifying exhaust gas, in particular, an excellent performance in purifying $NO_x$. Although the reason is not exactly clarified, the present inventors consider this as follows. That is, employment of the above structure suppresses alloying of platinum and/or palladium with rhodium.

The catalytic layer 20 further includes a carrier carrying the precious metal. The carrier plays a role in increasing the specific surface area of the precious metal and dissipating heat generated by the reactions to suppress sintering of the precious metal.

The carrier includes an oxygen storage material. The oxygen storage material plays a role in buffering fluctuations in air-fuel ratio of the exhaust gas by storing oxygen in the exhaust gas and emitting it into the exhaust gas. As the oxygen storage material, for example, a rare-earth oxide such as cerium oxide and praseodymium oxide, a transition metal oxide such as iron oxide and manganese oxide, or a mixture or composite oxide thereof can be used. Typically, cerium oxide is used as the oxygen storage material.

The present inventors had studied in the course of arriving at the present invention the reason why $H_2S$ was produced, in particular, the reason why $H_2S$ was produced when a vehicle was stopped. As a result, it was found as described below that the cooling rate of the catalyst after stopping the vehicle varied depending on the locations in the catalyst.

Firstly, prepared was an exhaust gas-purifying catalyst that comprised a catalytic layer uniformly containing precious metal and cerium oxide. The catalyst was mounted on an automotive vehicle and the drive conditions of the automotive vehicle were changed while measuring the temperature at positions away from the upstream end of the support by 0%, 16%, 33%, 55%, 67% and 83% of the overall length of the support. Specifically, the automotive vehicle was driven at a speed of about 40 km/h. At this moment, the temperature of the catalyst at the upstream end was about 400° C. Subsequently, the automotive vehicle was started from a standstill to a speed of about 100 km/h with the throttle wide open. The automotive vehicle was then stopped and was left while running the engine at idle.

As a result, no significant temperature differences existed between positions on the catalyst until the speed was reached to about 100 km/h. It was revealed, however, that the catalyst was less prone to cool at positions near the downstream end than positions near the upstream end in the period during which the speed was decreased and the period after stopping the vehicle. In particular, it was revealed that the duration during which the catalyst was kept at 500° C. or higher is much longer at positions near the downstream end of the catalyst than at positions near the upstream end.

Further, the characteristics of the components of the catalyst were studied. As a result, it was revealed that among the components of the catalyst, the oxygen storage material contributed the adsorption and desorption of $H_2S$. Although not clarified in detail, the following mechanism is considered.

An oxygen storage material such as cerium oxide is prone to react with sulfur constituents in the exhaust gas such as $SO_2$ to produce a compound such as $Ce(SO_4)_2$ in an oxidizing atmosphere at low temperatures (for example, when driven normally). That is, under such conditions, the oxygen storage material is prone to adsorb the sulfur constituents.

By contrast, in a reducing atmosphere at high temperatures (for example, when driven at high speeds or going up a hill), $SO_2$ or $H_2S$ is prone to be produced due to the reduction of the adsorbed sulfur constituents. That is, under such conditions, desorption of the sulfur constituents, in particular, emission of $H_2S$ is prone to occur. The $H_2S$ emission becomes significant in the case where the temperature of the catalyst is about 500° C. or higher. $H_2S$ is the main cause of the unpleasant odor of the exhaust gas.

As described above, in the case where the exhaust gas is a reducing gas at high temperatures, for example, at 500° C. or higher, $H_2S$ emission is significant. In addition, the downstream section of the exhaust gas-purifying catalyst is less prone to cool as compared with the upstream section thereof. Therefore, it is considered that $H_2S$ is produced mainly at the downstream section.

Based on the above-described findings, the following structure is employed herein. That is, an oxygen storage material content per unit volumetric capacity D2 in the second section 200 is smaller than an oxygen storage material content per unit volumetric capacity D1 in the first section 100. When such a structure is employed, adsorption of the sulfur constituents on the catalytic layer 20 will be relatively decreased in the second section 200.

The catalytic layer 20 may not contain the oxygen storage material in the second section 200 or may contain the oxygen storage material in both the first section 100 and the second section 200. In the latter case, a ratio D2/D1 is set at, for example, 0.5 or less.

The oxygen storage material contained in the first section 100 emits at least a part of the stored oxygen when the exhaust gas is changed from oxidizing to reducing. Thus, in this case, the reducing property of the exhaust gas having passed through the first section 100 and flowing into the second section 200 is weakened relatively. Therefore, the exhaust gas-purifying catalyst 1 is less prone to cause the reduction of the sulfur constituents adsorbed on the second section 200.

As described above, in the exhaust gas-purifying catalyst 1, an amount of sulfur constituents adsorbed on the catalytic layer 20 is small in the second section 200. In addition, in the exhaust gas-purifying catalyst 1, reduction of the sulfur constituents adsorbed on the second section 200 is less prone to occur. Therefore, the exhaust gas-purifying catalyst 1 has a decreased $H_2S$ emission.

In the case where exhaust gas passes through an exhaust gas-purifying catalyst containing an oxygen storage material, the exhaust gas flows into the downstream section of the catalyst with an air-fuel ratio adjusted by the oxygen storage material in the upstream section of the catalyst. That is, by the action of the oxygen storage material contained in the upstream section of the catalyst, fluctuations of air-fuel ratio of the exhaust gas is reduced in the downstream section of the catalyst. Therefore, the upstream section of the catalyst requires a larger amount of oxygen storage material, while the down stream section requires a smaller amount of oxygen storage material.

As described above, the present embodiment employs the structure in which the oxygen storage material content per unit volumetric capacity in the second section 200 is smaller than the oxygen storage material content per unit volumetric capacity in the first section 100. Nevertheless, the fluctuations in the air-fuel ratio of the exhaust gas flowing through the catalyst can be reduced to a level that is compatible to a level achieved in the case where the catalyst uniformly contains the oxygen storage material. That is, when such a structure is employed, it is possible to achieve a sufficient performance in purifying exhaust gas with a smaller amount of oxygen storage material.

Typically, the oxygen storage material content in the third catalytic layer 20C per unit volumetric capacity is smaller than the oxygen storage material content in the first catalytic layer 20A per unit volumetric capacity. Further, the oxygen storage material content in the second catalytic layer 20B per unit volumetric capacity is typically smaller than the oxygen storage material content in the first catalytic layer 20A per unit volumetric capacity. That is, the oxygen storage material content per unit volumetric capacity is smaller in the catalytic layer containing mainly rhodium as precious metal than that in the catalytic layer containing mainly platinum and/or palladium as precious metal. When such a structure is employed, it is possible to suppress the degradation of the performance in purifying exhaust gas as a lean fuel mixture due to the combined use of rhodium and an oxygen storage material. That is, when such a structure is employed, the performance of the exhaust gas-purifying catalyst 1 in purifying exhaust gas can be further improved with the oxygen storage material content in the catalytic layer 20 unchanged.

A ratio of the oxygen storage material content in the third catalytic layer 20C per unit volumetric capacity with respect to the oxygen storage material content in the first catalytic layer 20A per unit volumetric capacity is set, for example, at 0.8 or less, and typically within a range of 0.2 to 0.04. When the ratio is set at an excessively small value, the performance of rhodium in purifying exhaust gas may be degraded. When the ratio is set at an excessively large value, the $H_2S$ emission may be significant.

A ratio of the oxygen storage material content in the second catalytic layer 20B per unit volumetric capacity with respect to the oxygen storage material content in the first catalytic layer 20A per unit volumetric capacity is set, for example, at 1.5 or less, and typically within a range of 0.8 to 0.04. When the ratio is set at an excessively small value, the performance of rhodium in purifying exhaust gas may be degraded. When the ratio is set at an excessively large value, the $H_2S$ emission may be significant.

The first section 100 and the second section 200 may contain the same oxygen storage material or different oxygen storage materials. The first catalytic layer 20A, the second catalytic layer 20B and the third catalytic layer 20C may contain the same oxygen storage material or different oxygen storage materials.

The dimension of the first section 100 in the flow direction of the exhaust gas, that is, the coated width of the first section 100 is set within, for example, a range of 15% to 85% of the overall length of the support 10. The dimension of the second section 200 in the flow direction of the exhaust gas, that is, the coated width of the second section 200 is set within, for example, a range of 85% to 15% of the overall length of the support 10.

The boundary between the first section 100 and the second section 200 is defined, for example, as follows. Firstly, the oxygen storage material contents per unit volumetric capacity are determined at each of the positions on the exhaust gas-purifying catalyst 1 arranged in the flow direction of the exhaust gas. Next, calculated is an arithmetic mean of the oxygen storage material contents per unit volumetric capacity obtained for the above points. The boundary between the first section 100 and the second section 200 is on the position at which the oxygen storage material content per unit volumetric capacity is greater than the arithmetic mean and has a smallest distance from the downstream end of the exhaust gas-purifying catalyst 1. That is, the sections of the exhaust gas-purifying catalyst 1 located upstream and downstream of the above position are the first section 100 and the second section 200, respectively.

A surface area per unit volumetric capacity of the exhaust gas-purifying catalyst 1 is set within, for example, a range of 5,000 to 23,000 $m^2/L$, and typically a range of 5,000 to 16,000 $m^2/L$. Here, the "surface area" is a value obtained using a BET plot drawn on the basis of an $N_2$ adsorption isotherm at 77.4 K. When the surface area is decreased, the amount of the exhaust gas adsorbed on the catalytic layer 20 may be decreased to degrade the performance in purifying the exhaust gas. When the surface area is increased, the amount of the sulfur constituents adsorbed on the catalytic layer 20 may increase so as to increase the $H_2S$ emission. The surface area per unit volumetric capacity of the first section 100 may be equal to or different from the surface area per unit volumetric capacity of the second section 200. For example, when the latter is smaller than the former, it is possible that the adsorption of the sulfur constituents on the second section 200 is relatively suppressed and the $H_2S$ emission of the exhaust gas-purifying catalyst 1 is reduced significantly.

The carrier contained in the catalytic layer 20 may further include an oxide such as zirconium oxide, alumina or zeolite in addition to the oxygen storage material. Alternatively, the carrier may include a composite oxide of the oxygen storage material and the above oxide. The carrier may form a solid solution with the precious metal.

The catalytic layer 20 may further include a binder. The binder plays, for example, a role of strengthening the bond between the carrier particles and the bond between carrier particle and the precious metal to improve the endurance of the exhaust gas-purifying catalyst 1. As the binder, for example, alumina sol, titania sol or silica sol can be used.

The catalytic layer 20 may further include an acidic component. The acidic component plays a role of reducing the number of sites on the catalytic layer 20 to which the sulfur constituents adhere so as to reduce the amount of sulfur constituents adsorbed thereon and the $H_2S$ emission. As the acidic component, a component having an electronegativity greater than that of one of the metal elements constituting the catalytic layer 20 that is contained therein at the largest amount can be used. As such an acidic component, for example, at least one element selected from the group consisting of titanium, tungsten, silicon, molybdenum, phosphorous and niobium can be used. Typically, the acidic component is contained in the catalytic layer 20 as an element of the oxide constituting the carrier.

In the present embodiment, the exhaust gas-purifying catalyst 1 is manufactured by, for example, the following method.

Firstly, prepared is a support 10 made of cordierite, etc. and provided with one or more through-holes through which exhaust gas flows.

Next, prepared is slurry for forming a first catalytic layer 20A. Specifically, a solution of a precious metal compound such as platinum compound, a carrier containing cerium oxide, etc., and optionally a compound containing the acidic component and/or a binder are mixed together to prepare slurry having a desired composition. A section of the support 10 extending from the downstream end and having a predetermined length is then coated with the slurry, and the coated film thus obtained is dried.

Subsequently, prepared is slurry for forming a third catalytic layer 20C. Specifically, a solution of a precious metal compound such as rhodium compound, a carrier containing cerium oxide, etc., and optionally a compound containing the acidic component and/or a binder are mixed together to prepare slurry having a desired composition. A section of the support 10 extending from the downstream end and having a predetermined length is then coated with the slurry, and the coated film thus obtained is dried.

Subsequently, prepared is slurry for forming a second catalytic layer 20B. Specifically, a solution of a precious metal compound such as rhodium compound, a carrier containing cerium oxide, etc., and optionally a compound containing the acidic component and/or a binder are mixed together to prepare slurry having a desired composition. A section of the support 10 extending from the upstream end and having a predetermined length is then coated with the slurry, and the coated film thus obtained is dried.

The slurry for forming the second catalytic layer 20 and the slurry for forming the third catalytic layer 20C may have the same composition or different compositions. In the case where their compositions are the same, the support 10 may be coated with this slurry over its length such that the first catalytic layer 20A is covered with the slurry. In this case, of the layer formed using this slurry, the portion in the first section 100 and the portion in the second section 200 are the second catalytic layer 20B and the third catalytic layer 20C, respectively.

Then, the coated layers are subjected to a heat treatment. The exhaust gas-purifying catalyst 1 is thus obtained.

EXAMPLES

Example 1

Manufacture of Catalyst C1

Firstly, a solution of dinitrodiamine platinum nitrate, cerium oxide powder, zirconium oxide powder, alumina powder and alumina sol were mixed together to prepare slurry. Hereinafter, the slurry is referred to as "slurry SA".

Next, a solution of rhodium nitrate, cerium oxide powder, zirconium oxide powder, alumina powder and alumina sol were mixed together to prepare slurry. Hereinafter, the slurry is referred to as "slurry SB".

Then, a monolith honeycomb support made of cordierite was prepared. A section of the support extending from the upstream end and having a length equal to 50% of the overall length of the support was coated with the slurry SA and then dried. The coated layer thus obtained corresponds to the first catalytic layer.

Subsequently, a section of the support extending from the downstream end and having a length equal to 70% of the overall length of the support was coated with the slurry SB and then dried. The coated layer thus obtained corresponds to the third catalytic layer.

Further, a section of the support extending from the upstream end and having a length equal to 70% of the overall length of the support was coated with the slurry SB and then dried. The coated layer thus obtained corresponds to the second catalytic layer.

Then, the coated layers were subjected to a heat treatment in an oxidizing atmosphere at 500° C. for 1 hour. Hereinafter, the exhaust gas-purifying catalyst thus obtained is referred to as "catalyst C1". In the catalyst C1, the portion of the support extending from the upstream end and having a length equal to 50% of the overall length of the support corresponds to the "first section", while the portion of the support extending from the downstream end and having a length equal to 50% of the overall length of the support corresponds to the "second section".

The first catalytic layer of the catalyst C1 had a platinum content per unit volumetric capacity of $6.2 \times 10^{-3}$ mol/L, a cerium oxide content per unit volumetric capacity of 0.17 mol/L, a zirconium oxide content per unit volumetric capacity of 0.49 mol/L, and an alumina content per unit volumetric capacity of 0.39 mol/L. On the other hand, the second and third catalytic layers of the catalyst C1 had a rhodium content per unit volumetric capacity of $0.84 \times 10^{-3}$ mol/L, a cerium oxide content per unit volumetric capacity of 0.08 mol/L, a zirconium oxide content per unit volumetric capacity of 0.17 mol/L, and an alumina content per unit volumetric capacity of 0.21 mol/L.

Namely, in the catalyst C1, a ratio of the cerium oxide content in the first catalytic layer per unit volumetric capacity with respect the cerium oxide content in the third catalytic layer per unit volumetric capacity was 0.47. Also, in the catalyst C1, a ratio of the cerium oxide content in the first catalytic layer per unit volumetric capacity with respect the cerium oxide content in the second catalytic layer per unit volumetric capacity was 0.47.

In the catalyst C1, the cerium oxide content D1 per unit volumetric capacity in the first section was 0.25 mol/L, while the cerium oxide content D2 per unit volumetric capacity in the second section was 0.08 mol/L. Namely, in the catalyst C1, a ratio of the cerium oxide content D2 with respect to the cerium oxide content D1 was 0.32. The catalyst C1 had a surface area per unit volumetric capacity of 11,600 m$^2$/L.

Example 2

Manufacture of Catalyst C2

Prepared was the same slurry as the slurry SB except that the cerium oxide powder content and the zirconium oxide content were decreased and the alumina content was increased. Hereinafter, the slurry thus obtained is referred to as "slurry SC".

An exhaust gas-purifying catalyst was manufactured by the same method as that described for the catalyst C1 except that the slurry SC was used instead of the slurry SB. Hereinafter, the catalyst thus obtained is referred to as "catalyst C2".

The first catalytic layer of the catalyst C2 had a platinum content per unit volumetric capacity of $6.2 \times 10^{-3}$ mol/L, a cerium oxide content per unit volumetric capacity of 0.17 mol/L, a zirconium oxide content per unit volumetric capacity of 0.49 mol/L, and an alumina content per unit volumetric capacity of 0.39 mol/L. On the other hand, the second and third catalytic layers of the catalyst C2 had a rhodium content per unit volumetric capacity of $0.84 \times 10^{-3}$ mol/L, a cerium oxide content per unit volumetric capacity of 0.02 mol/L, a zirconium oxide content per unit volumetric capacity of 0.09 mol/L, and an alumina content per unit volumetric capacity of 0.56 mol/L.

Namely, in the catalyst C2, a ratio of the cerium oxide content in the first catalytic layer per unit volumetric capacity with respect the cerium oxide content in the third catalytic layer per unit volumetric capacity was 0.12. Also, in the catalyst C2, a ratio of the cerium oxide content in the first catalytic layer per unit volumetric capacity with respect the cerium oxide content in the second catalytic layer per unit volumetric capacity was 0.12.

In the catalyst C2, the cerium oxide content D1 per unit volumetric capacity in the first section was 0.19 mol/L, while the cerium oxide content D2 per unit volumetric capacity in the second section was 0.02 mol/L. Namely, in the catalyst C2, a ratio of the cerium oxide content D2 with respect to the cerium oxide content D1 was 0.105. The catalyst C2 had a surface area per unit volumetric capacity of 15,000 m$^2$/L.

Example 3

Manufacture of Catalyst C3

Prepared was the same slurry as the slurry SC except that the rhodium content was increased. Hereinafter, the slurry thus obtained is referred to as "slurry SD".

Prepared also was the same slurry as the slurry SC except that the rhodium content was decreased. Hereinafter, the slurry thus obtained is referred to as "slurry SE".

An exhaust gas-purifying catalyst was manufactured by the same method as that described for the catalyst C1 except that the slurry SD was used as the material of the third catalytic layer instead of the slurry SB and the slurry SE was used as the material of the second catalytic layer instead of the slurry SB. Hereinafter, the catalyst thus obtained is referred to as "catalyst C3".

The first catalytic layer of the catalyst C3 had a platinum content per unit volumetric capacity of 6.2×10$^{-3}$ mol/L, a cerium oxide content per unit volumetric capacity of 0.17 mol/L, a zirconium oxide content per unit volumetric capacity of 0.49 mol/L, and an alumina content per unit volumetric capacity of 0.39 mol/L. The second catalytic layer of the catalyst C3 had a rhodium content per unit volumetric capacity of 0.42×10$^{-3}$ mol/L, a cerium oxide content per unit volumetric capacity of 0.02 mol/L, a zirconium oxide content per unit volumetric capacity of 0.09 mol/L, and an alumina content per unit volumetric capacity of 0.56 mol/L. The third catalytic layer of the catalyst C3 had a rhodium content per unit volumetric capacity of 1.26×10$^{-3}$ mol/L, a cerium oxide content per unit volumetric capacity of 0.02 mol/L, a zirconium oxide content per unit volumetric capacity of 0.09 mol/L, and an alumina content per unit volumetric capacity of 0.56 mol/L.

Namely, in the catalyst C3, a ratio of the cerium oxide content in the first catalytic layer per unit volumetric capacity with respect the cerium oxide content in the third catalytic layer per unit volumetric capacity was 0.12. Also, in the catalyst C3, a ratio of the cerium oxide content in the first catalytic layer per unit volumetric capacity with respect the cerium oxide content in the second catalytic layer per unit volumetric capacity was 0.12.

In the catalyst C3, the cerium oxide content D1 per unit volumetric capacity in the first section was 0.19 mol/L, while the cerium oxide content D2 per unit volumetric capacity in the second section was 0.02 mol/L. Namely, in the catalyst C3, a ratio of the cerium oxide content D2 with respect to the cerium oxide content D1 was 0.105. The catalyst C3 had a surface area per unit volumetric capacity of 15,000 m$^2$/L.

Example 4

Manufacture of Catalyst C4

A solution of dinitrodiamine platinum nitrate, a solution of rhodium nitrate, cerium oxide powder, zirconium oxide powder, alumina powder and alumina sol were mixed together to prepare slurry. Hereinafter, the slurry is referred to as "slurry SF".

An exhaust gas-purifying catalyst was manufactured by the same method as that described for the catalyst C1 except that the slurry SF was used instead of the slurry SA. Hereinafter, the catalyst thus obtained is referred to as "catalyst C4".

The first catalytic layer of the catalyst C4 had a platinum content per unit volumetric capacity of 1.0×10$^{-3}$ mol/L, a palladium content per unit volumetric capacity of 9.4×10$^{-3}$ mol/L, a cerium oxide content per unit volumetric capacity of 0.23 mol/L, a zirconium oxide content per unit volumetric capacity of 0.65 mol/L, and an alumina content per unit volumetric capacity of 0.39 mol/L. On the other hand, the second and third catalytic layers of the catalyst C4 had a rhodium content per unit volumetric capacity of 0.84×10$^{-3}$ mol/L, a cerium oxide content per unit volumetric capacity of 0.02 mol/L, a zirconium oxide content per unit volumetric capacity of 0.09 mol/L, and an alumina content per unit volumetric capacity of 0.56 mol/L.

Namely, in the catalyst C4, a ratio of the cerium oxide content in the first catalytic layer per unit volumetric capacity with respect the cerium oxide content in the third catalytic layer per unit volumetric capacity was 0.087. Also, in the catalyst C3, a ratio of the cerium oxide content in the first catalytic layer per unit volumetric capacity with respect the cerium oxide content in the second catalytic layer per unit volumetric capacity was 0.087.

In the catalyst C4, the cerium oxide content D1 per unit volumetric capacity in the first section was 0.25 mol/L, while the cerium oxide content D2 per unit volumetric capacity in the second section was 0.02 mol/L. Namely, in the catalyst C4, a ratio of the cerium oxide content D2 with respect to the cerium oxide content D1 was 0.08. The catalyst C4 had a surface area per unit volumetric capacity of 15,800 m$^2$/L.

Example 5

Manufacture of Catalyst C5

Prepared was the same slurry as the slurry SA except that the cerium oxide content and the zirconium oxide content were decreased and the alumina content was increased. Hereinafter, the slurry thus obtained is referred to as "slurry SG".

Prepared also was the same slurry as the slurry SB except that the cerium oxide content and the zirconium oxide content were increased. Hereinafter, the slurry thus obtained is referred to as "slurry SH".

An exhaust gas-purifying catalyst was manufactured by the same method as that described for the catalyst C2 except that the slurry SG was used as the material of the first catalytic layer instead of the slurry SA and the slurry SH was used as the material of the second catalytic layer instead of the slurry SC. Hereinafter, the catalyst thus obtained is referred to as "catalyst C5".

The first catalytic layer of the catalyst C5 had a platinum content per unit volumetric capacity of 6.2×10$^{-3}$ mol/L, a cerium oxide content per unit volumetric capacity of 0.12 mol/L, a zirconium oxide content per unit volumetric capacity of 0.32 mol/L, and an alumina content per unit volumetric capacity of 0.69 mol/L. The second catalytic layer of the catalyst C5 had a rhodium content per unit volumetric capacity of 0.84×10$^{-3}$ mol/L, a cerium oxide content per unit volumetric capacity of 0.06 mol/L, a zirconium oxide content per unit volumetric capacity of 0.32 mol/L, and an alumina content per unit volumetric capacity of 0.21 mol/L. The third catalytic layer of the catalyst C5 had a rhodium content per unit volumetric capacity of $0.84 \times 10^{-3}$ mol/L, a cerium oxide content per unit volumetric capacity of 0.02 mol/L, a zirconium oxide content per unit volumetric capacity of 0.09 mol/L, and an alumina content per unit volumetric capacity of 0.56 mol/L.

Namely, in the catalyst C5, a ratio of the cerium oxide content in the first catalytic layer per unit volumetric capacity with respect the cerium oxide content in the third catalytic layer per unit volumetric capacity was 0.17. Also, in the catalyst C5, a ratio of the cerium oxide content in the first catalytic layer per unit volumetric capacity with respect the cerium oxide content in the second catalytic layer per unit volumetric capacity was 0.5.

In the catalyst C5, the cerium oxide content D1 per unit volumetric capacity in the first section was 0.18 mol/L, while the cerium oxide content D2 per unit volumetric capacity in the second section was 0.02 mol/L. Namely, in the catalyst C5, a ratio of the cerium oxide content D2 with respect to the cerium oxide content D1 was 0.11. The catalyst C5 had a surface area per unit volumetric capacity of 14,600 m²/L.

Example 6

Manufacture of Catalyst C6

Prepared was the same slurry as the slurry SG except that the cerium oxide content, the zirconium oxide content and the alumina content were decreased. Hereinafter, the slurry thus obtained is referred to as "slurry SI".

An exhaust gas-purifying catalyst was manufactured by the same method as that described for the catalyst C2 except that the slurry SI was used as the material of the first catalytic layer instead of the slurry SA and the slurry SB was used as the material of the second catalytic layer instead of the slurry SC. Hereinafter, the catalyst thus obtained is referred to as "catalyst C6".

The first catalytic layer of the catalyst C6 had a platinum content per unit volumetric capacity of $6.2 \times 10^{-3}$ mol/L, a cerium oxide content per unit volumetric capacity of 0.08 mol/L, a zirconium oxide content per unit volumetric capacity of 0.23 mol/L, and an alumina content per unit volumetric capacity of 0.47 mol/L. The second catalytic layer of the catalyst C6 had a rhodium content per unit volumetric capacity of $0.84 \times 10^{-3}$ mol/L, a cerium oxide content per unit volumetric capacity of 0.09 mol/L, a zirconium oxide content per unit volumetric capacity of 0.17 mol/L, and an alumina content per unit volumetric capacity of 0.21 mol/L. The third catalytic layer of the catalyst C6 had a rhodium content per unit volumetric capacity of $0.84 \times 10^{-3}$ mol/L, a cerium oxide content per unit volumetric capacity of 0.02 mol/L, a zirconium oxide content per unit volumetric capacity of 0.09 mol/L, and an alumina content per unit volumetric capacity of 0.56 mol/L.

Namely, in the catalyst C6, a ratio of the cerium oxide content in the first catalytic layer per unit volumetric capacity with respect the cerium oxide content in the third catalytic layer per unit volumetric capacity was 0.25. Also, in the catalyst C6, a ratio of the cerium oxide content in the first catalytic layer per unit volumetric capacity with respect the cerium oxide content in the second catalytic layer per unit volumetric capacity was 1.125.

In the catalyst C6, the cerium oxide content D1 per unit volumetric capacity in the first section was 0.17 mol/L, while the cerium oxide content D2 per unit volumetric capacity in the second section was 0.02 mol/L. Namely, in the catalyst C6, a ratio of the cerium oxide content D2 with respect to the cerium oxide content D1 was 0.12. The catalyst C6 had a surface area per unit volumetric capacity of 12,300 m²/L.

Example 7

Manufacture of Catalyst C7

Prepared was the same slurry as the slurry SB except that the cerium oxide content, the zirconium oxide content and the alumina content were increased. Hereinafter, the slurry thus obtained is referred to as "slurry SJ".

An exhaust gas-purifying catalyst was manufactured by the same method as that described for the catalyst C2 except that the slurry SG was used as the material of the first catalytic layer instead of the slurry SA, the slurry SJ was used as the material of the third catalytic layer instead of the slurry SC, and the slurry SH was used as the material of the second catalytic layer instead of the slurry SC. Hereinafter, the catalyst thus obtained is referred to as "catalyst C7".

The first catalytic layer of the catalyst C7 had a platinum content per unit volumetric capacity of $6.2 \times 10^{-3}$ mol/L, a cerium oxide content per unit volumetric capacity of 0.12 mol/L, a zirconium oxide content per unit volumetric capacity of 0.32 mol/L, and an alumina content per unit volumetric capacity of 0.69 mol/L. The second catalytic layer of the catalyst C7 had a rhodium content per unit volumetric capacity of $0.84 \times 10^{-3}$ mol/L, a cerium oxide content per unit volumetric capacity of 0.06 mol/L, a zirconium oxide content per unit volumetric capacity of 0.32 mol/L, and an alumina content per unit volumetric capacity of 0.21 mol/L. The third catalytic layer of the catalyst C7 had a rhodium content per unit volumetric capacity of $0.84 \times 10^{-3}$ mol/L, a cerium oxide content per unit volumetric capacity of 0.14 mol/L, a zirconium oxide content per unit volumetric capacity of 0.29 mol/L, and an alumina content per unit volumetric capacity of 0.15 mol/L.

Namely, in the catalyst C7, a ratio of the cerium oxide content in the first catalytic layer per unit volumetric capacity with respect the cerium oxide content in the third catalytic layer per unit volumetric capacity was 1.17. Also, in the catalyst C7, a ratio of the cerium oxide content in the first catalytic layer per unit volumetric capacity with respect the cerium oxide content in the second catalytic layer per unit volumetric capacity was 0.5.

In the catalyst C7, the cerium oxide content D1 per unit volumetric capacity in the first section was 0.18 mol/L, while the cerium oxide content D2 per unit volumetric capacity in the second section was 0.14 mol/L. Namely, in the catalyst C7, a ratio of the cerium oxide content D2 with respect to the cerium oxide content D1 was 0.78. The catalyst C7 had a surface area per unit volumetric capacity of 13,400 m²/L.

Example 8

Manufacture of Catalyst C8

Comparative Example

Firstly, a solution of dinitrodiamine platinum nitrate, a solution of rhodium nitrate, cerium oxide powder, zirconium oxide powder, alumina powder and an alumina binder were mixed together to prepare slurry. Hereinafter, the slurry is referred to as "slurry SK".

Prepared also was the same slurry as the slurry SK except that the rhodium content was increased and the platinum content, the cerium oxide content, the zirconium oxide content and the alumina content were decreased. Hereinafter, the slurry thus obtained is referred to as "slurry SL".

Next, a monolith honeycomb support made of cordierite was prepared. A section of the support extending from the upstream end and having a length equal to 50% of the overall length of the support was coated with the slurry SR and then dried. Subsequently, a section of the support extending from the downstream end and having a length equal to 50% of the overall length of the support was coated with the slurry SL and then dried. Then, the coated layers were subjected to a heat treatment in an oxidizing atmosphere at 500° C. for 1 hour. Hereinafter, the exhaust gas-purifying catalyst thus obtained is referred to as "catalyst C8". In the catalyst C8, the portion of the support extending from the upstream end and having a length equal to 50% of the overall length of the support corresponds to the "first section", while the portion of the support extending from the downstream end and having a length equal to 50% of the overall length of the support corresponds to the "second section".

The first section of the catalyst C8 had a platinum content per unit volumetric capacity of $5.1 \times 10^{-3}$ mol/L, a rhodium content per unit volumetric capacity of $0.39 \times 10^{-3}$ mol/L, a cerium oxide content D1 per unit volumetric capacity of 0.35 mol/L, a zirconium oxide content per unit volumetric capacity of 0.49 mol/L, and an alumina content per unit volumetric capacity of 0.78 mol/L. On the other hand, the second section of the catalyst C8 had a platinum content per unit volumetric capacity of $1.0 \times 10^{-3}$ mol/L, a rhodium content per unit volumetric capacity of $1.9 \times 10^{-3}$ mol/L, a cerium oxide content D2 per unit volumetric capacity of 0.12 mol/L, a zirconium oxide content per unit volumetric capacity of 0.32 mol/L, and an alumina content per unit volumetric capacity of 0.29 mol/L. In the catalyst C8, a ratio of the cerium oxide content D2 with respect to the cerium oxide content D1 was 0.34. The catalyst C8 had a surface area per unit volumetric capacity of 13,200 $m^2$/L.

The data for the catalysts C1 to C8 are summarized in the TABLES 1 and 2 below.

TABLE 2

| Catalyst | Cerium oxide content D1 in the 1st section (mol/L) | Cerium oxide content D1 in the 2nd section (mol/L) | Surface area per unit volumetric capacity ($m^2$/L) |
|---|---|---|---|
| C1 | 0.25 | 0.08 | 11,600 |
| C2 | 0.19 | 0.02 | 15,000 |
| C3 | 0.19 | 0.02 | 15,000 |
| C4 | 0.25 | 0.02 | 15,800 |
| C5 | 0.18 | 0.02 | 14,600 |
| C6 | 0.17 | 0.02 | 12,300 |
| C7 | 0.18 | 0.14 | 13,400 |
| C8 (Comparative example) | 0.35 | 0.12 | 13,200 |

<Measurement of $NO_x$ Emission>

The catalysts C1 to C8 were subjected to an endurance test at 950° C. for 50 hours using an engine with a piston displacement of 4.3 L. Subsequently, each of the catalysts C1 to C8 was mounted on an automotive vehicle having an inline four-cylinder engine with a piston displacement of 2.4 L. Then, the vehicle was driven in the LA#4 (hot) mode and an $NO_x$ emission was measured.

Figure 3:
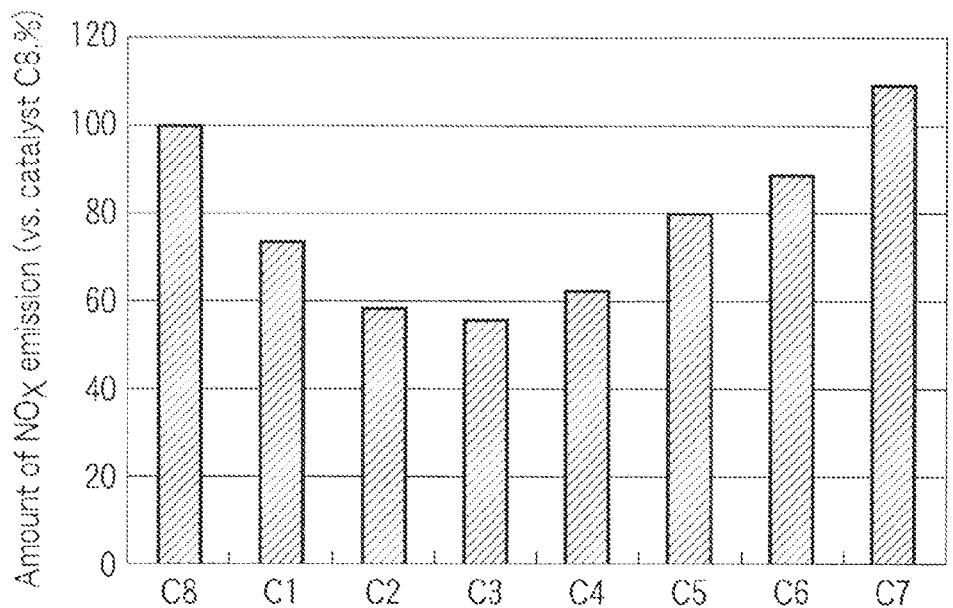
FIG. 3 is a bar graph showing $NO_x$ emissions for catalysts.

FIG. 3 is a bar graph showing $NO_x$ emissions for the exhaust gas-purifying catalysts. In FIG. 3, the $NO_x$ emissions for the catalysts C1 to C8 are shown as relative values with the value obtained for the catalyst C8 supposed to be 100.

As will be apparent from FIG. 3, the catalysts C1 to C6 achieved an excellent $NO_x$ purifying performance as compared with the catalyst C8. The catalyst C7 achieved almost the same NO purifying performance as that achieved by the catalyst C8.

<Measurement of $H_2S$ Emission>

A start catalyst (SC) and the catalyst C1 were mounted on an exhaust system of an automotive vehicle having an inline four-cylinder engine with a piston displacement of 2.4 L such

TABLE 1

| | | Precious metal ($\times 10^{-3}$ mol/L) | | | Oxygen storage material (mol/L) | Others (mol/L) | |
|---|---|---|---|---|---|---|---|
| Catalyst | Catalytic layer | Pt | Pd | Rh | Cerium oxide | Zirconium oxide | Alumina |
| C1 | 1st catalytic layer | 6.2 | — | — | 0.17 | 0.49 | 0.39 |
| | 2nd catalytic layer | — | — | 0.84 | 0.08 | 0.17 | 0.21 |
| | 3rd catalytic layer | — | — | 0.84 | 0.08 | 0.17 | 0.21 |
| C2 | 1st catalytic layer | 6.2 | — | — | 0.17 | 0.49 | 0.39 |
| | 2nd catalytic layer | — | — | 0.84 | 0.02 | 0.09 | 0.56 |
| | 3rd catalytic layer | — | — | 0.84 | 0.02 | 0.09 | 0.56 |
| C3 | 1st catalytic layer | 6.2 | — | — | 0.17 | 0.49 | 0.39 |
| | 2nd catalytic layer | — | — | 0.42 | 0.02 | 0.09 | 0.56 |
| | 3rd catalytic layer | — | — | 1.26 | 0.02 | 0.09 | 0.56 |
| C4 | 1st catalytic layer | 1.0 | 9.4 | 0 | 0.23 | 0.65 | 0.39 |
| | 2nd catalytic layer | — | — | 0.84 | 0.02 | 0.09 | 0.56 |
| | 3rd catalytic layer | — | — | 0.84 | 0.02 | 0.09 | 0.56 |
| C5 | 1st catalytic layer | 6.2 | — | — | 0.12 | 0.32 | 0.69 |
| | 2nd catalytic layer | — | — | 0.84 | 0.06 | 0.32 | 0.21 |
| | 3rd catalytic layer | — | — | 0.84 | 0.02 | 0.09 | 0.56 |
| C6 | 1st catalytic layer | 6.2 | — | — | 0.08 | 0.23 | 0.47 |
| | 2nd catalytic layer | — | — | 0.84 | 0.09 | 0.17 | 0.21 |
| | 3rd catalytic layer | — | — | 0.84 | 0.02 | 0.09 | 0.56 |
| C7 | 1st catalytic layer | 6.2 | — | — | 0.12 | 0.32 | 0.69 |
| | 2nd catalytic layer | — | — | 0.84 | 0.06 | 0.32 | 0.21 |
| | 3rd catalytic layer | — | — | 0.84 | 0.14 | 0.29 | 0.15 | that the start catalyst and the catalyst C1 were arranged from the engine's side in this order. Then, an $H_2S$ emission was measured while the drive conditions of the automotive vehicle were changed as follows.

Specifically, the automotive vehicle was driven at a speed of 40 km/h for a predetermined period of time so as to cause the adsorption of sulfur constituents on the catalyst C1. Subsequently, acceleration was performed to a speed of 100 km/h with the throttle wide open. When the speed reached 100 km/h, the throttle was closed to stop the vehicle, and then the vehicle was left for a predetermined period of time while running the engine at idle. The above measurement was also performed on the catalysts C2 to C8.

Figure 4:
FIG. 4 is a bar graph showing $H_2S$ emissions for the catalysts.

FIG. 4 is a bar graph showing $H_2S$ emissions for the exhaust gas-purifying catalysts. In FIG. 4, the integrated values of the amount of $H_2S$ emitted by the catalysts C1 to C8 within 60 seconds after stopping the vehicle are shown as relative values with the value obtained for the catalyst C8 supposed to be 100.

As will be apparent from FIG. 4, in the case where the catalysts C1 to C6 were used, the $H_2S$ emission was decreased as compared with the case where the catalyst C8 was used. In the case where the catalyst C7 was used, the $H_2S$ emission was almost the same as that in the case where the catalyst C8 was used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising:
   a support provided with one or more through-holes through which exhaust gas flows; and
   a catalytic layer supported by the support and containing an oxygen storage material,
   wherein the exhaust gas-purifying catalyst includes a first section to which the exhaust gas is supplied, and a second section to which the exhaust gas having passed through the first section is supplied,
   wherein the catalytic layer includes a layered structure of a first catalytic layer containing platinum and/or palladium and a second catalytic layer containing rhodium in the first section and further includes a third catalytic layer containing rhodium in the second section,
   wherein a sum of platinum and palladium contents in the first catalytic layer per unit volumetric capacity is greater than a sum of platinum and palladium contents in the second catalytic layer per unit volumetric capacity and a sum of platinum and palladium contents in the third catalytic layer per unit volumetric capacity, and a rhodium content in the second catalytic layer per unit volumetric capacity and a rhodium content in the third catalytic layer per unit volumetric capacity are greater than a rhodium content in the first catalytic layer per unit volumetric capacity,
   wherein the second section is smaller in oxygen storage material content per unit volumetric capacity than the first section, and
   wherein a ratio of the oxygen storage material content in the third catalytic layer per unit volumetric capacity with respect to the oxygen storage material content in the first catalytic layer per unit volumetric capacity is in a range of 0.2 to 0.04.

2. The exhaust gas-purifying catalyst according to claim 1, wherein an oxygen storage material content in the second catalytic layer per unit volumetric capacity is smaller than an oxygen storage material content in the first catalytic layer per unit volumetric capacity.

3. The exhaust gas-purifying catalyst according to claim 2, wherein the second catalytic layer faces the substrate with the first catalytic layer interposed therebetween.

4. The exhaust gas-purifying catalyst according to claim 3, wherein the first catalytic layer contains only platinum and/or palladium as precious metal, and the second catalytic layer contains only rhodium as precious metal.

5. The exhaust gas-purifying catalyst according to claim 4, wherein the third catalytic layer contains only rhodium as precious metal.

6. The exhaust gas-purifying catalyst according to claim 5, wherein the exhaust gas-purifying catalyst contains only palladium in the first section, the catalytic layer contained in the second section is only the third catalytic layer, the oxygen storage material is cerium oxide, cerium oxide content in the first catalyst layer is in a range of 0.08 mol/L to 0.23 mol/L, cerium oxide content in the second catalyst layer is in a range of 0.02 mol/L to 0.09 mol/L, and cerium oxide content in the third catalyst layer is in a range of 0.02 mol/L to 0.08 mol/L.

7. The exhaust gas-purifying catalyst according to claim 1, wherein a ratio of the oxygen storage material content in the second catalytic layer per unit volumetric capacity with respect to the oxygen storage material content in the first catalytic layer per unit volumetric capacity is in a range of 0.8 to 0.04.

8. The exhaust gas-purifying catalyst according to claim 1, wherein a ratio of the oxygen storage material content per unit volumetric capacity in the second section with respect to the oxygen storage material content per unit volumetric capacity in the first section is 0.5 or less.

9. The exhaust gas-purifying catalyst according to claim 1, wherein the third catalytic layer contains only rhodium as the precious metal, only palladium in the first section, and the catalytic layer contained in the second section is only the third catalytic layer.

10. An exhaust gas-purifying catalyst consisting of:
    a support provided with one or more through-holes through which exhaust gas flows; and
    a catalytic layer supported by the support and containing an oxygen storage material,
    wherein the exhaust gas-purifying catalyst includes a first section to which the exhaust gas is supplied, and a second section to which the exhaust gas having passed through the first section is supplied,
    wherein the catalytic layer includes a layered structure of a first catalytic layer containing platinum and/or palladium and a second catalytic layer containing rhodium in the first section and further includes a third catalytic layer containing rhodium in the second section,
    wherein a sum of platinum and palladium contents in the first catalytic layer per unit volumetric capacity is greater than a sum of platinum and palladium contents in the second catalytic layer per unit volumetric capacity and a sum of platinum and palladium contents in the third catalytic layer per unit volumetric capacity, and a rhodium content in the second catalytic layer per unit volumetric capacity and a rhodium content in the third catalytic layer per unit volumetric capacity are greater than a rhodium content in the first catalytic layer per unit volumetric capacity, wherein the second section is smaller in oxygen storage material content per unit volumetric capacity than the first section, and wherein a ratio of the oxygen storage material content in the third catalytic layer per unit volumetric capacity with respect to the oxygen storage material content in the first catalytic layer per unit volumetric capacity is in a range of 0.2 to 0.04.

11. The exhaust gas-purifying catalyst according to claim 10, wherein an oxygen storage material content in the second catalytic layer per unit volumetric capacity is smaller than an oxygen storage material content in the first catalytic layer per unit volumetric capacity.

12. The exhaust gas-purifying catalyst according to claim 11, wherein the second catalytic layer faces the substrate with the first catalytic layer interposed therebetween.

13. The exhaust gas-purifying catalyst according to claim 12, wherein the first catalytic layer contains only platinum and/or palladium as precious metal, and the second catalytic layer contains only rhodium as precious metal.

14. The exhaust gas-purifying catalyst according to claim 13, wherein the third catalytic layer contains only rhodium as precious metal.

15. The exhaust gas-purifying catalyst according to claim 10, wherein a ratio of the oxygen storage material content in the second catalytic layer per unit volumetric capacity with respect to the oxygen storage material content in the first catalytic layer per unit volumetric capacity is in a range of 0.8 to 0.04.

16. The exhaust gas-purifying catalyst according to claim 10, wherein a ratio of the oxygen storage material content per unit volumetric capacity in the second section with respect to the oxygen storage material content per unit volumetric capacity in the first section is 0.5 or less.

17. The exhaust gas-purifying catalyst according to claim 10, wherein the third catalytic layer contains only rhodium as the precious metal, only palladium in the first section, and the catalytic layer contained in the second section is only the third catalytic layer.

* * * * *

UNITED STATES PATENT AND TRADEMARK OFFICE
CERTIFICATE OF CORRECTION

PATENT NO.         : 8,927,454 B2
APPLICATION NO.    : 13/282803
DATED              : January 6, 2015
INVENTOR(S)        : Minoru Itou et al.

It is certified that error appears in the above-identified patent and that said Letters Patent is hereby corrected as shown below:

On the title page, item (73), under "Assignee",

"Cataler Corporation, Shizouka (JP)" should read

-- Cataler Corporation, Shizuoka (JP)
   Toyota Jidosha Kabushiki Kaisha, Aichi (JP)
   Kabushiki Kaisha Toyota Chuo Kenkyusho, Aichi (JP) --

Signed and Sealed this
Seventeenth Day of May, 2016

Michelle K. Lee
*Director of the United States Patent and Trademark Office*